United States Patent [19]

Horiguchi et al.

[11] Patent Number: 4,885,458
[45] Date of Patent: Dec. 5, 1989

[54] CARD-FORM RECORDING MEDIUM AND DATA RECORDING DEVICE THEREFOR

[75] Inventors: Toshio Horiguchi; Yuichiro Akatsuka, both of Hachioji; Hisakatsu Tanaka, Chofu, all of Japan

[73] Assignee: Olympus Optical Co., Ltd., Tokyo, Japan

[21] Appl. No.: 150,090

[22] Filed: Jan. 29, 1988

[30] Foreign Application Priority Data

Feb. 4, 1987 [JP] Japan .................................. 62-22576
Feb. 5, 1987 [JP] Japan .................................. 62-23690

[51] Int. Cl.⁴ .......................... G06K 7/10; G06K 7/14
[52] U.S. Cl. ........................................ 235/454; 360/2; 369/44

[58] Field of Search ............... 369/44; 360/2; 235/454

[56] References Cited

U.S. PATENT DOCUMENTS 4,754,339 6/1988 Nagai et al. ........................... 369/44

FOREIGN PATENT DOCUMENTS 58-500462 3/1983 Japan .

Primary Examiner—Harold I. Pitts
Attorney, Agent, or Firm—Frishauf, Holtz, Goodman & Woodward

[57] ABSTRACT

A plurality of recording tracks are formed on an optical card. A data record starting flag or data record and flag is formed on at least one of both sides of the recording tracks in the track extending direction.

12 Claims, 16 Drawing Sheets

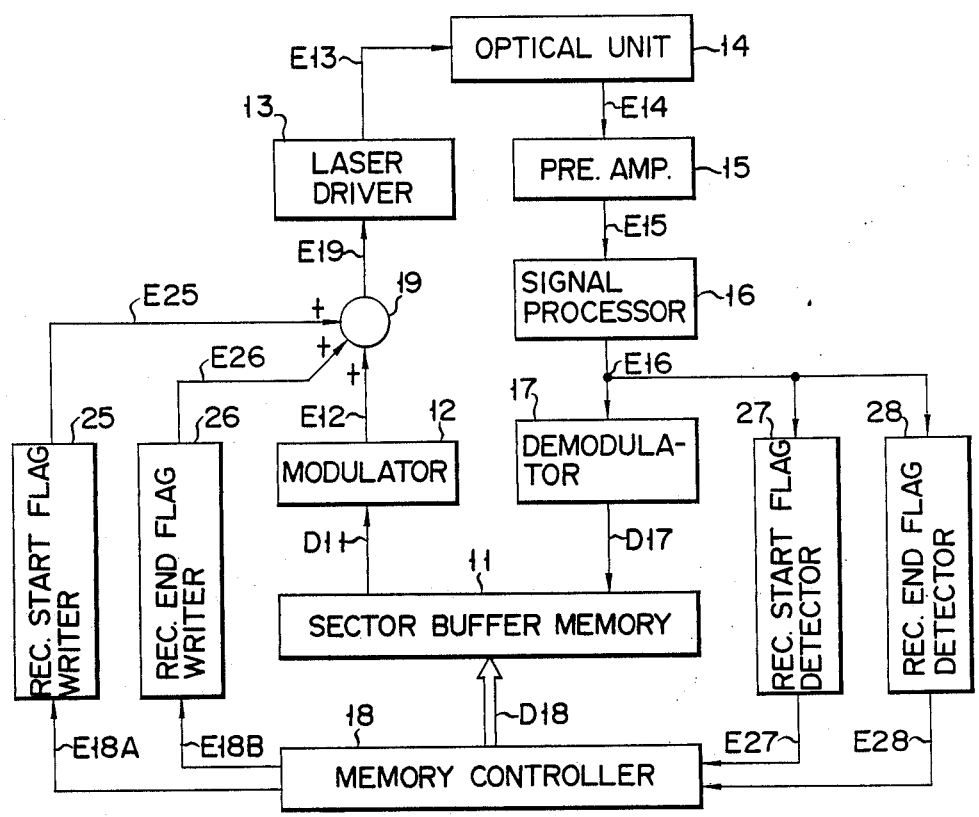
F I G. 2

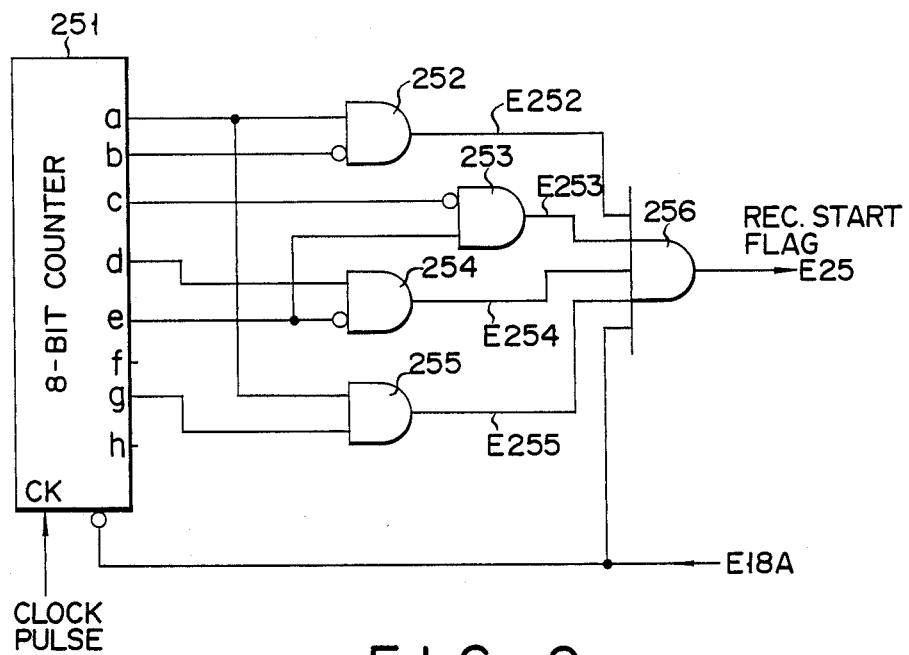
F I G. 9
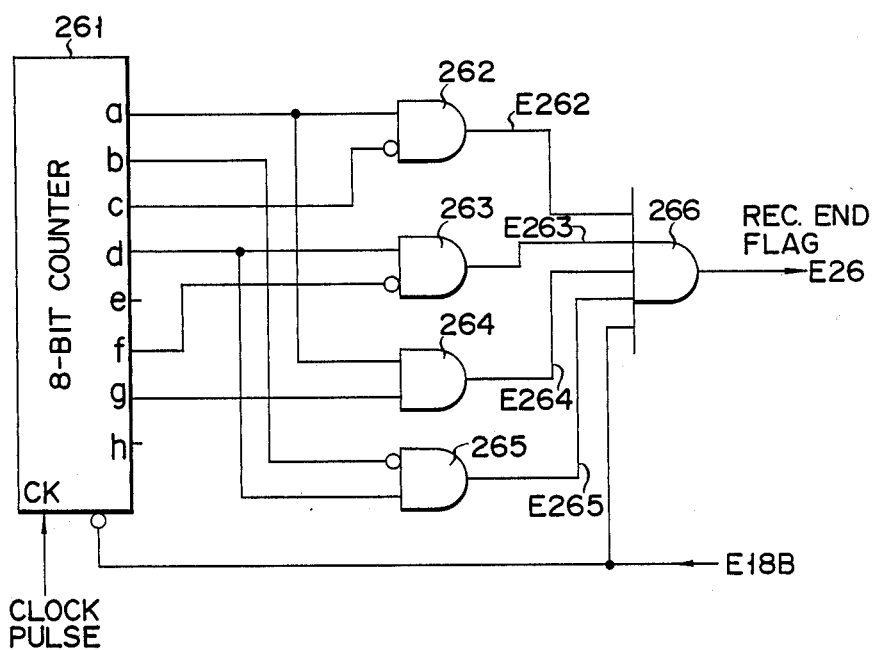
F I G. 10

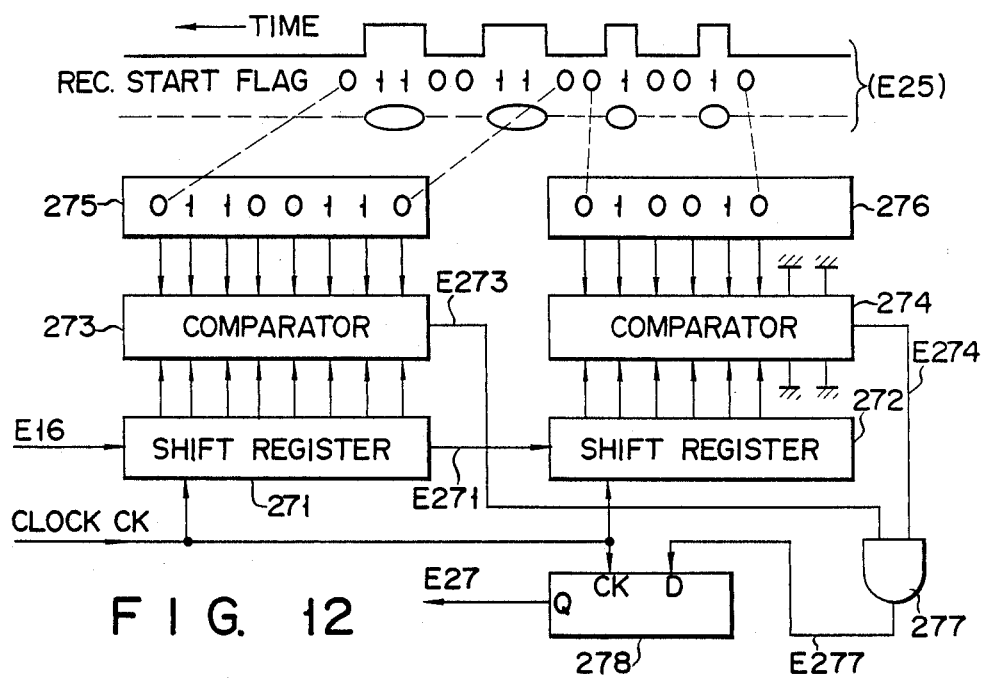
F I G. 12
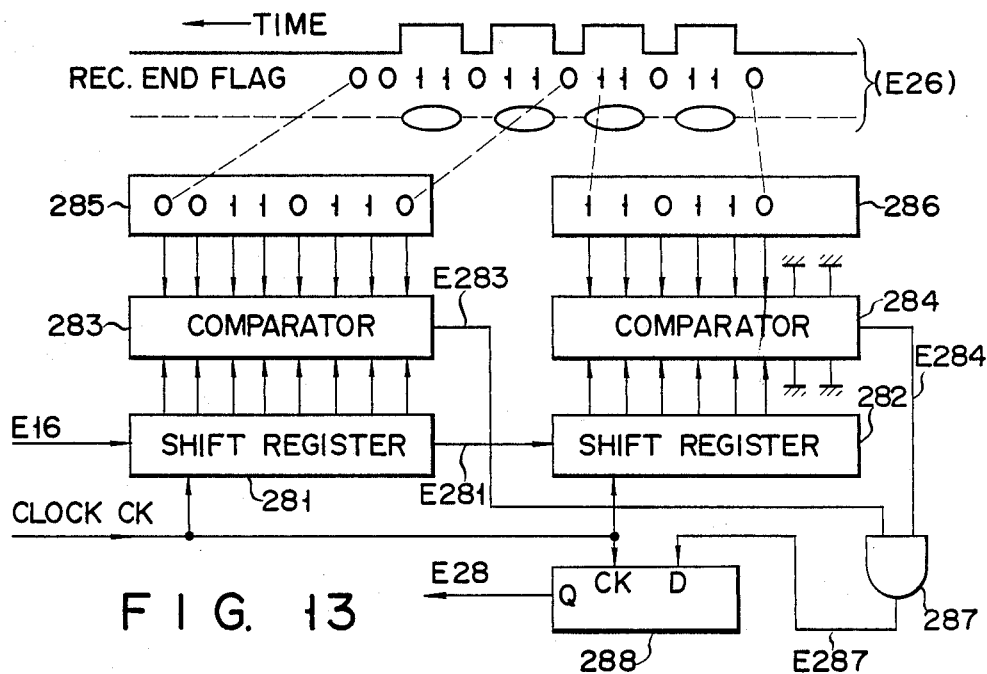
F I G. 13

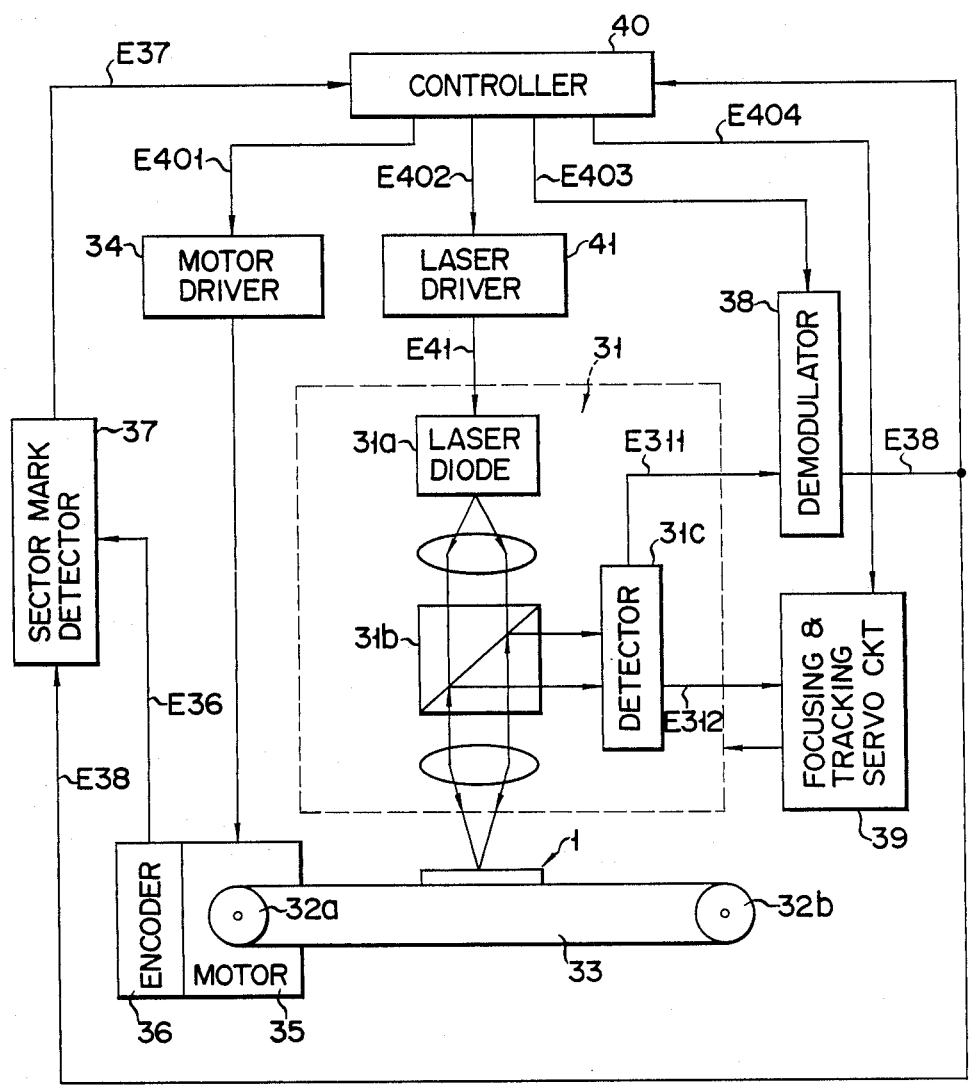
F I G. 19

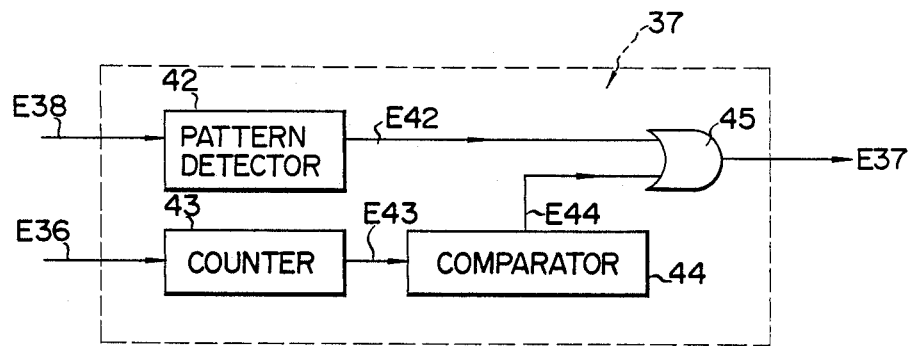
F I G. 21
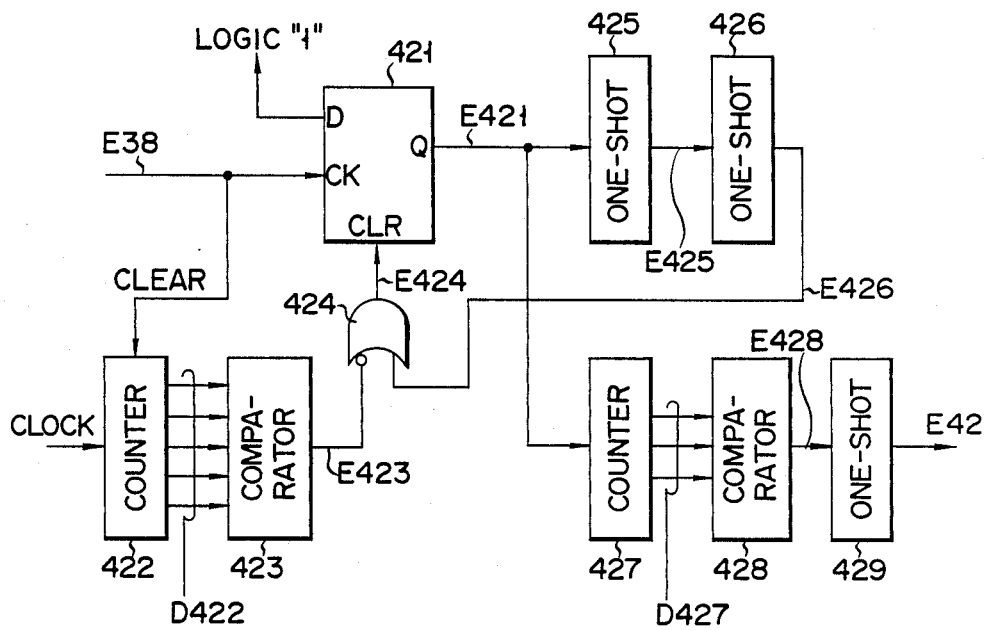
F I G. 22

CARD-FORM RECORDING MEDIUM AND DATA RECORDING DEVICE THEREFOR

BACKGROUND OF THE INVENTION

This invention relates to a card-form medium, such as optical cards and magnetic cards, and a data recording device for recording data on the medium.

In a recording and/or reproduction system utilizing, for example, an optical card as the recording medium, the recording and/or reproduction operation is effected by reciprocally moving the optical card, having a plurality of parallel tracks, in the track extending direction as well as in the direction perpendicular to the track extending direction. This reciprocal movement is carried out relative to an optical head for performing recording on and/or reproduction from the optical card.

An optical card used in such a system is disclosed in, for example, Japanese Patent Disclosure No. 58-500462. In this Japanese Patent Disclosure, various optical cards have been proposed.

FIG. 5 shows an example of the optical card corresponding to that disclosed in the Japanese Patent Disclosure 58-500462. Optical card 1 has data recording area 2 on which a plurality of tracks extending in the longitudinal direction are parallel arranged in the width direction. ID sections 3 and 4, containing data such as track addresses, are provided on both ends of the tracks in recording area 2. Recording tracks for recording data are formed between ID sections 3 and 4.

FIG. 6 exemplifies an enlarged view of the track of optical card 1 shown in FIG. 5. The track is formed of recording track 6 and guide tracks 7 used for achieving the tracking. ID section 3 is used to record data section 8 on recording track 6 and to reproduce data section 8 from the left end thereof in the drawing. ID section 4 is used to reproduce data section 8 from the right end thereof in the drawing.

As shown in FIGS. 7A and 7B, ID sections 3 and 4 respectively include synchronizing sections (SYNC) 3a and 4a for attaining synchronization of self-reproduction clock, synchronizing patterns (DM) 3b and 4b indicating the head of data, and track number sections (TRACK NO.) 3c and 4c having track numbers recorded therein. Further, as shown in FIG. 7C, data section 8 includes data section synchronizing patterns (DM) 8b and 8c indicating the head of data provided on both sides of necessary information (DATA) 8a, and data section synchronizing sections (SYNC) 8d and 8e for attaining synchronization of self-reproduction clock. Data section synchronizing section 8d and data section synchronizing pattern 8b are used when data 8a is reproduced from the left end in the drawing, and data section synchronizing section 8e and data section synchronizing pattern 8c are used when data 8a is reproduced from the right end in the drawing.

FIG. 8 shows the construction of a recording/reproduction device, adapted to optical card 1 described above. With this construction, data is recorded on the optical card by modulating recording data D11 from sector buffer memory 11 by modulator 12, and controlling laser driver 13 by modulation signal E12 thus obtained, in order to adjust the driving current so that output power of a semiconductor laser in optical unit 14 exceeds the sensitivity (recording threshold) of recording material of the optical card. In this case, the recording of the data section is effected only in one direction of the relative reciprocal movement between optical unit 14 and the optical card in the track extending direction, for example, only in a direction from left to right in FIG. 5.

In order to reproduce data recorded in the data section, output signal E14 from optical unit 14 is first amplified by pre-amplifier 15, then converted into binary coded reproduction signal E16 by signal processor 16, and demodulated by demodulator 17. Demodulated output data D17 from demodulator 17 is stored in sector buffer memory 11.

In the data reproducing operation, demodulated data D17 is stored from the head of sector buffer memory 11 according to address data D18 (moving direction signal) from controller 18 when the optical card moves relative to optical unit 14 in the same direction as in the data recording operation, and is stored from the tail of sector buffer memory 11 when the optical card moves in the opposite direction.

However, in the data recording method described above, the data recording direction is fixed in a preset direction. Consequently, it becomes necessary to re-set the optical card or optical unit to the predetermined record starting position after completing one track data recording, in case where data is successively recorded over a plurality of tracks, for example. Further, even when one track data is used for recording, it is necessary to set the optical card or optical unit to the starting position before recording, if it is located in a position opposite to the record starting position. For this reason, time for data recording is liable to become long and the efficiency or convenience is worsened. (First Problem)

The optical card has a memory capacity of several thousand to ten thousand times that of a magnetic card. Although data cannot be erased in an optical card as in an optical disc, it has a memory capacity as large as 1 to 2 M bytes. Therefore, it has been considered to use the optical card as a bankbook, portable map, prepaid card for purchase or the like.

In the prior art, in order to record data on the optical disc, one track is divided into a plurality of sectors and access is made for each sector. In this case, each sector has an ID section (which is generally preformed) indicating the address thereof, and a data section for data readout/write-in. In the ID section, a track number, a sector number, a code indicating the head or tail of the disc, an error detection/correction code, and the like are recorded as a sector address.

A control device for accessing the optical disc is constituted to access a desired sector after reading out information in the ID section.

Generally, in the optical card, the amount of data to be written into one track is 512 to 1024 bytes, and it is a common practice to use one track as one sector. However, there are certain cases wherein the amount of 512 to 1024 bytes data to be processed is too large for accessing the card and it may be preferably set to 64 to 128 bytes. In this case, since the optical card is a read-only medium, part of the recording region cannot be used. In order to solve this problem, it is necessary to use another card format in which one track is divided into a plurality of sectors as in the optical disc and access is made for each sector.

FIG. 25 shows an optical card having such a card format. Optical card 1 has four ID sections 4ax, 4bx, 4cx, and 4dx, and four data sections 5ax, 5bx, 5cx, and 5dx, provided in optical recording area 2x in which a plurality of parallel tracks 6x are formed. ID sections 4ax, 4bx, 4cx, and 4dx are precoded to designate respective addresses of data sections 5ax, 5bx, 5cx, and 5dx.

As shown in FIG. 26, each of ID sections 4ax, 4bx, 4cx, and 4dx includes PLL synchronizing gap section 261, byte synchronizing pattern 262, track number 263, sector number 264, and error correction code 265, and has a memory capacity of 18 bytes, for example.

With optical card 1x, data readout/write-in with respect to a target sector in the target track can be effected, by first reading out the contents of ID sections 4ax, 4bx, 4cx, and 4dx to detect the current track and sector positions and then, accessing the target track and the target sector while comparing the detected track/sector positions with the target track/sector positions.

However, in optical card 1x of FIG. 25, it is necessary to use many ID sections for accessing data sections 5ax, 5bx, 5cx, and 5dx, equal in number to the data sections. For this reason, the amount of data that can be used for other purposes than ID's is reduced. This problem becomes more serious when the number of divisions in one track increases and the area occupied by the ID section becomes large. (Second Problem)

SUMMARY OF THE INVENTION

A first object of this invention is to provide a data recording device which can effectively record data on a card-form recording medium in a manner that data can be reproduced in either direction.

A second object of this invention is to provide an optical card having a plurality of sectors divided in a data recording section without substantially reducing the amount of data to be used.

The first object can be attained by a data recording device which records data together with information indicating the data recording direction, while the card-form recording medium is being reciprocally moved relative to a recording head in either direction.

The second object can be attained by an optical card having an ID section containing address information, and a data recording section divided into a plurality of sectors by at least one sector mark. The data recording section can be accessed by the ID section. The sector mark includes a specified pattern having no address information, and is arranged in the data recording section.

BRIEF DESCRIPTION OF THE DRAWINGS

FIG. 2 is a block diagram showing the construction of a device for writing/detecting a record starting flag/record end flag in/from an optical card (card-form recording medium) which employs the pattern shown in FIG. 1A or 1B;

FIG. 9 shows an example of a record starting flag write-in circuit in the recording/reproduction device of FIG. 2;

FIG. 10 shows an example of a record end flag write-in circuit in the recording/reproduction device of FIG. 2;

FIG. 12 shows an example of a record starting flag detection circuit in the recording/reproduction device of FIG. 2;

FIG. 13 shows an example of a record end flag detection circuit in the recording/reproduction device of FIG. 2;

FIG. 19 is a diagram showing the construction of a recording/reproduction device for recording/reproducing data on/from the optical card shown in FIG. 16;

FIG. 21 shows an example of a sector mark detector in the device of FIG. 19;

FIG. 22 shows an example of a pattern detector in FIG. 21;

DETAILED DESCRIPTION OF THE PREFERRED EMBODIMENTS

Figure 1A:
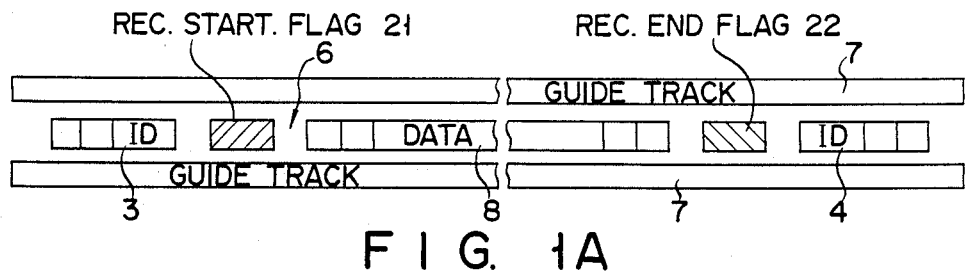
FIG. 1A shows the recording pattern of a card-form recording medium according to one embodiment of this invention.
Figure 1B:
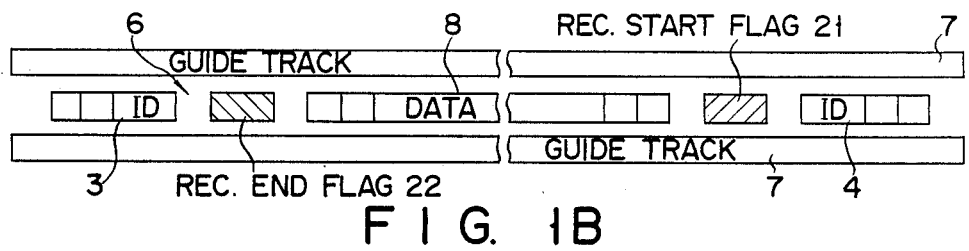
FIG. 1B is a modification of the recording pattern shown in FIG. 1A.
Figure 5:
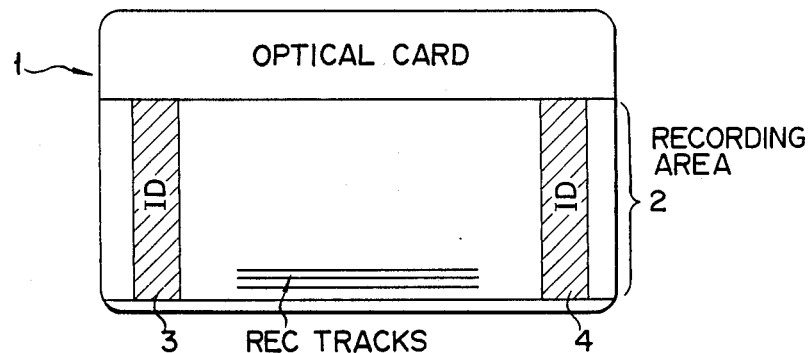
FIG. 5 is a diagram showing the construction of a prior art optical card.
Figure 6:
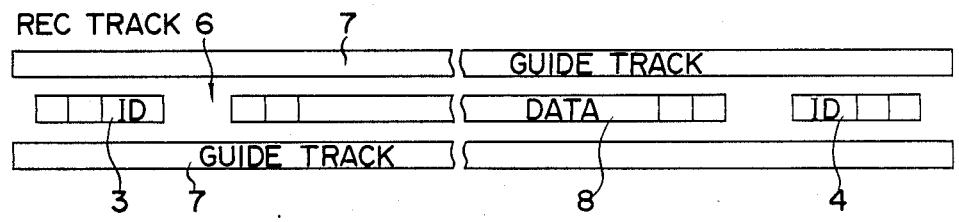
FIG. 6 is an enlarged view of the recording track in the optical card shown in FIG. 5.

FIGS. 1A and 1B show a first embodiment of invention. In this embodiment, data is recorded on such an optical card as shown in FIG. 5, and record starting flag 21, indicating the data record starting position, and record end flag 22, indicating the data record end position, are recorded between data section 8 and ID section 3 and between data section 8 and ID section 4. Thus, ID sections 3 and 4 are provided on both sides of the data section. The modulation rule of data section 8 does not apply to record starting/end flags 21 and 22. These flags are constituted by unique patterns which differ from the pattern of the data section.

In this embodiment, when data section 8 is recorded, record starting flag 21 is first recorded, data section 8 is next recorded and then, record end flag 22 is recorded, in either direction of the relative reciprocal movement between the optical card and a recording head. FIG. 1A shows the case where data section 8 is recorded from left to right, and FIG. 1B shows the case where the data section is recorded from right to left.

When data thus recorded is to be reproduced, whether the demodulated data has been stored from the head or tail of a sector buffer memory can be determined according as which flag (record starting flag 21 or record end flag 22) is first detected prior to the detection of data section 8. When, for example, record starting flag 21 is first detected, the demodulated data is stored from the head of the sector buffer memory. When record end flag 22 is first detected, or when the reproducing direction is set opposite to the recording direction, the demodulated data is stored from the tail of the sector buffer memory.

Figure 8:
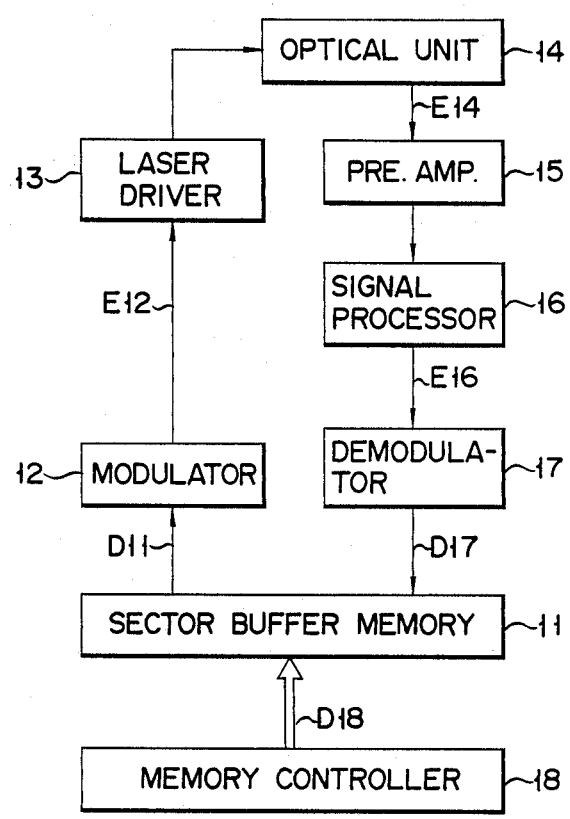
FIG. 8 is a diagram showing the construction of a recording/reproduction device for recording/reproducing data with respect to the prior art optical card.
Figure 11:
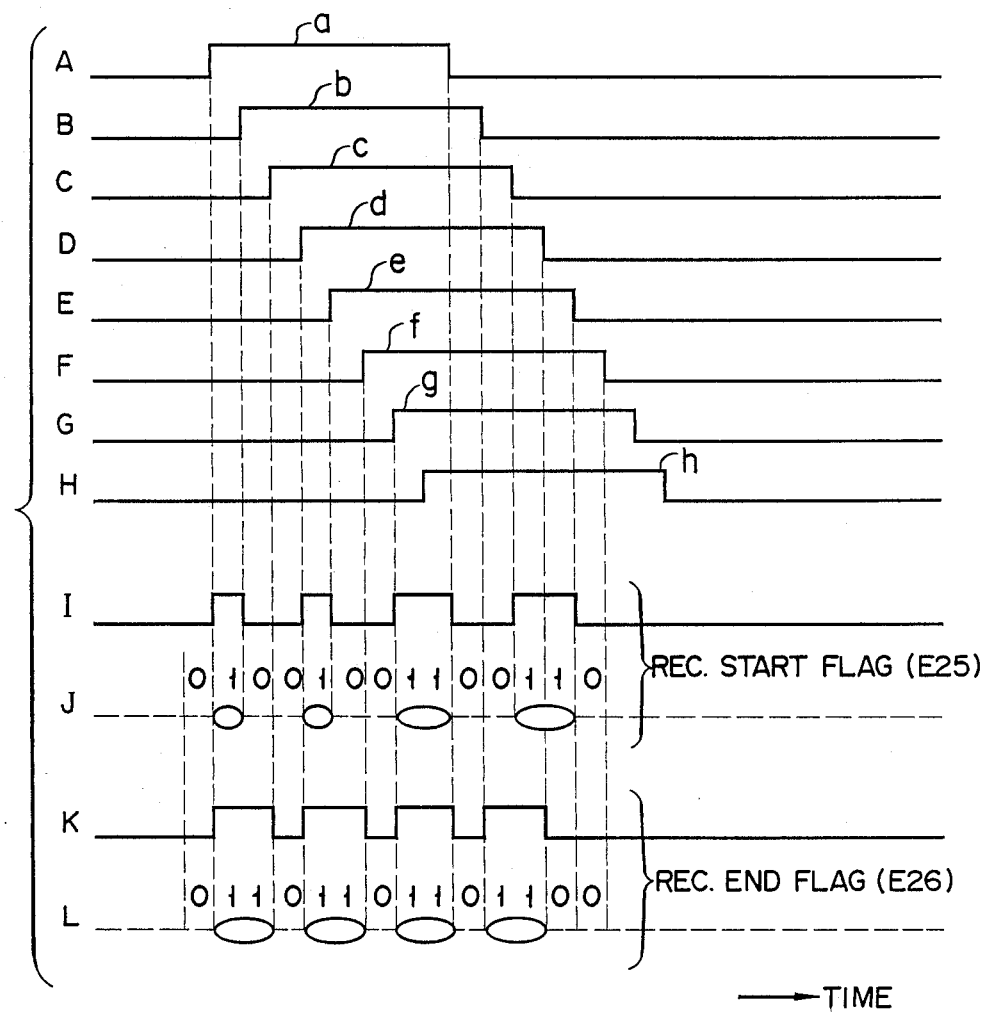
FIGS. 11A to 11L are timing charts for illustrating the operation of the flag write-in circuits of FIGS. 9 and 10.

FIG. 2 is a block diagram showing the construction of one example of a data recording/reproducing device for an optical card according to one embodiment of this invention. The data recording/reproducing device can be attained by additionally using record starting flag writer 25, record end flag writer 26, record starting flag detector 27, record end flag detector 28, and adder 19 for combining outputs E25, E26, and E12 from devices 25, 26, and 12, with the device shown in FIG. 8.

With this construction, when the data section is recorded, record starting flag writer 25 is first driven by memory controller 18 while the optical card is moved in either direction of the reciprocal movement relative to optical unit 14. Then, laser driver 13 causes optical unit 14 to record the record starting flag (21) on the recording track of the optical card according to output E25 of record starting flag writer 25. Next, recording data D11 is output from sector buffer memory 11, and recorded in the same manner as described above by means of modulator 12 and laser driver 13. After this, record end flag writer 26 is driven to generate output E26 which causes laser driver 13 to record the record end flag (22).

In the reproduction mode, record starting flag detector 27 and record end flag detector 28 function to detect respective flags E25 and E26 from binary coded reproduction signal E16 output from signal processor 16. When record starting flag E25 is first detected, sector buffer memory 11 is controlled by controller 18 so that demodulated data D17 can be stored in sector buffer memory 11 from the head address thereof. When record end flag E26 is first detected, sector buffer memory 11 is controlled to permit demodulated data D17 to be stored from the tail address of sector buffer memory 11.

As described above, since data can be recorded in either direction of the relative reciprocal movement between the optical card and optical unit 14, data can be efficiently or timesavingly recorded. Further, data can be reproduced in either direction with high reliability without using a signal indicating the direction of the reciprocal movement of the optical card.

Figure 3A:
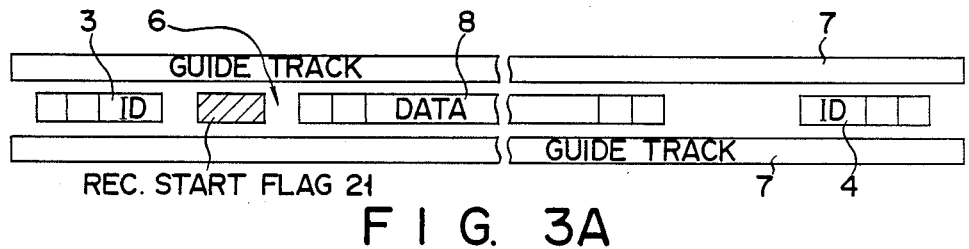
FIG. 3A shows the recording pattern of a card-form recording medium according to another embodiment of this invention.
Figure 3B:
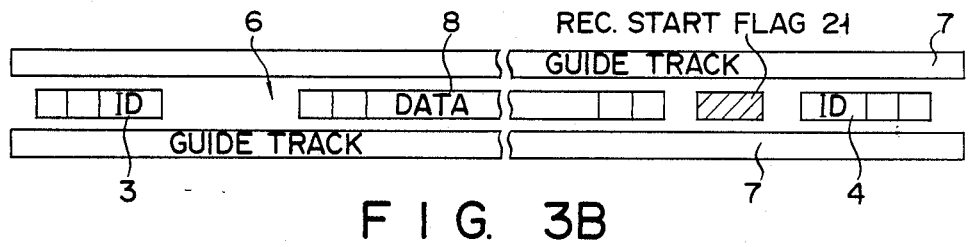
FIG. 3B is a modification of the recording pattern shown in FIG. 3A.

FIGS. 3A and 3B show a second embodiment of this invention. In this embodiment, the recording of record end flag 22 in the first embodiment is omitted. FIGS. 3A and 3B respectively show recording formats in the cases where data section 8 is recorded from the left to right and from the right to left. Thus, even if only record starting flag 21 is recorded, the recording direction can be determined according to the presence or absence of record starting flag 21 or according as to whether record starting flag 21 or data section 8 is first detected. Therefore, also in this embodiment, the same effect as in the first embodiment (FIG. 1A or 1B) can be attained.

Further, it is also possible to omit record starting flag 21 if record end flag 22 is recorded. In this case, the same effect can also be attained.

Figure 4A:
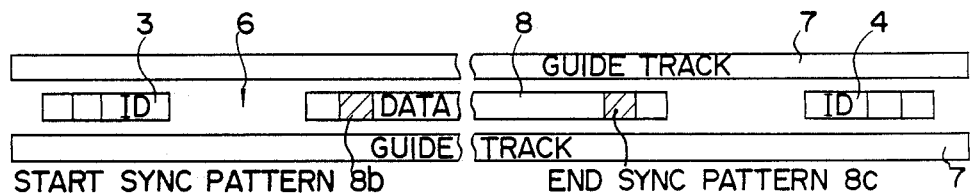
FIG. 4A shows the recording pattern of a card-form recording medium according to still another embodiment of this invention.
Figure 4B:
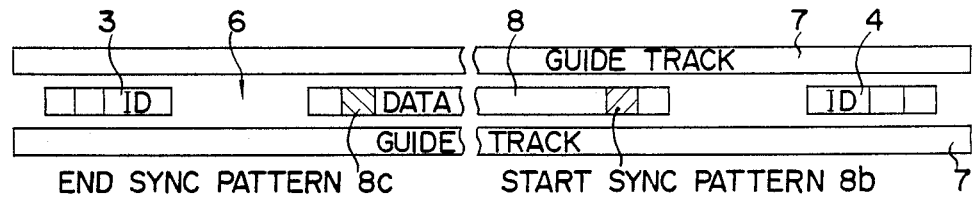
FIG. 4B is a modification of the recording pattern shown in FIG. 4A.

FIGS. 4A and 4B show a third embodiment of this invention. In this embodiment, flags, indicating the recording direction used in the first and second embodiments, are not recorded. However, synchronizing patterns 8b and 8c, constituting part of data section 8, are formed to have the function of representing the recording start and recording end so as to indicate the recording direction. FIGS. 4A and 4B respectively show the cases of recording from the left to right and from the right to left.

A recording/reproduction device for dealing with the data format as described above can be easily constituted by using two sets of recording circuit and detecting circuit for the synchronizing pattern. In this embodiment, the same effect as in the former embodiments can be attained.

It is also possible that only one of synchronizing patterns 8b and 8c is formed to have the function of indicating the recording direction as in the case of FIG. 3A or 3B.

In the embodiments described above, the optical card is used, but this invention can be applied to other card-form recording mediums such as magnetic cards.

FIG. 9 shows an example of record starting flag writer 25 in the recording/reproduction device of FIG. 2. In the circuit, record starting flag E25 is represented by a 14-bit code of "01001001100110". FIG. 10 shows an example of record end flag writer 26 in the recording/ reproduction device of FIG. 2. In this circuit, record end flag E26 is represented by a 14-bit of "01101101101100". FIGS. 11A to 11L are timing charts for explaining the operation of flag writers 25 and 26.

In FIG. 9, 8-bit counter 251 starts to count clock pulse CK when record starting flag enable signal E18A is produced from memory controller 18. Counter 251 produces pulses a to h shown in FIGS. 11A to 11H according to the count. Pulses a and b are converted to pulse E252 by means of AND gate 252. Pulses c and e are converted to pulse E253 by means of AND gate 253. Pulses d and e are converted to pulse E254 by means of AND gate 254. Pulses a and g are converted to pulse E255 by means of AND gate 255.

Pulses E252 to E255 and enable signal E18A are converted to record starting flag E25 shown in FIG. 11I by means of AND gate 256. Record starting flag E25 is recorded on an optical card or magnetic card in the form of such a pattern as shown in FIG. 11J.

Likewise, in FIG. 10, 8-bit counter 261 starts to count clock pulse CK when record end flag enable signal E18B is produced from memory controller 18. Counter 261 produces pulses a to h shown in FIGS. 11A to 11H according to the count. Pulses a and c are converted to pulse E262 by means of AND gate 262. Pulses d and f are converted to pulse E263 by means of AND gage 263. Pulse a and g are converted to pulse E264 by means of AND gate 264. Pulses b and d are converted to pulse E265 by means of AND gate 265.

Pulses E262 to E265 and enable signal E18B are converted to record end flag E26 shown in FIG. 11K by means of AND gate 266. Record starting flag E26 is recorded on the optical card or magnetic card in the form of such a pattern as shown in FIG. 11L.

FIG. 12 shows an example of record starting flag detector 27 in the recording/reproduction device of FIG. 2, and FIG. 13 shows an example of record end flag detector 28 in the recording/reproduction device of FIG. 2.

In FIG. 12, binary coded reproduction signal E16 is supplied to 8-bit shift register 271. Output E271 of shift register 271 is input to 8-bit shift register 272. Thus, shift registers 271 and 272 store successive 16-bit data in binary coded reproduction signal E16.

Lower 8-bit data, which is stored in shift register 271 and included in 16-bit data stored in shift registers 271 and 272, is compared with lower 8-bit data "01100110" of record starting flag E25 previously stored in register 275 by comparator 273. When the contents of registers 271 and 275 coincide with each other, comparator 273 produces lower digit data coincidence signal E273.

Upper 8-bit data, which is stored in shift register 272 and included in 16-bit data stored in shift registers 271 and 272, is compared with upper 6-bit data "010010" of record starting flag E25 previously stored in register 276 by comparator 274. In this case, upper two bits of the 8-bit data in registers 272 and 276 are neglected in the comparing operation. When the contents of registers 272 and 276 coincide with each other, comparator 274 produces upper digit data coincidence signal E274.

Upper and lower digit data coincidence signals E274 and E273 are supplied to AND gate 277 which in turn supplies output E277 to D-input terminal of D type flip-flop 278. When high level output E277 is supplied to D-input terminal, flip-flop 278 generates record starting flag detection signal E27 in response to subsequent clock CK. Signal E27 is thus obtained when record starting flag E25, as is shown in FIG. 11I, is detected from binary coded reproduction signal E16.

In FIG. 13, binary coded reproduction signal E16 is supplied to 8-bit shift register 281. Output E281 of shift register 281 is input to 8-bit shift register 282. Thus, shift registers 281 and 282 store successive 16-bit data in binary coded reproduction signal E16.

Lower 8-bit data, which is stored in shift register 281 and included in 16-bit data stored in shift registers 281 and 282, is compared with lower 8-bit data "01101100" of recorded end flag E26 previously stored in register 285 by comparator 283. (It should be noted that the order of "0"s and "1"s in FIG. 13 is reversed with respect to that in FIG. 11.) When the contents of registers 281 and 285 coincide with each other, comparator 283 produces lower digit data coincidence signal E283.

Upper 8-bit data, which is stored in shift register 282 and included in 16-bit data stored in shift registers 281 and 282, is compared with upper 6-bit data "011011" of record end flag E26 previously stored in register 286 by comparator 284. In this case, upper two bits of the 8-bit data in registers 282 and 286 are neglected in the comparing operation. When the contents of registers 282 and 286 coincide with each other, comparator 284 produces upper digit data coincidence signal E284.

Upper and lower digit data coincidence signals E284 and E283 are supplied to AND gate 287 which in turn supplies output E287 to D-input terminal of D type flip-flop 288. When high level output E287 is supplied to D-input terminal, flip-flop 288 generates record end flag detection signal E28 in response to subsequent clock CK. Thus, signal E28 is generated when record end flag E26, as is shown in FIG. 11K, is detected from binary coded reproduction signal E16.

Figure 14:
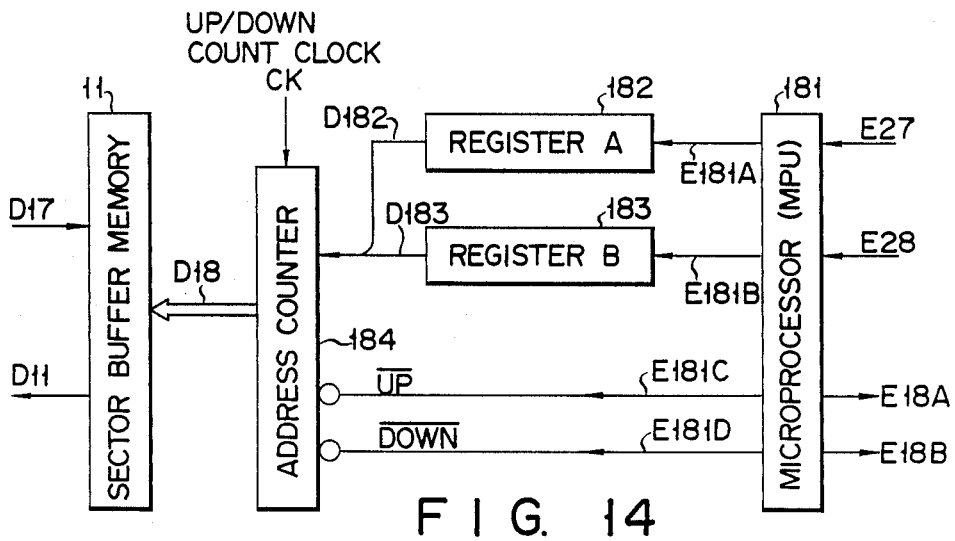
FIG. 14 is an example of a memory control circuit in the recording/reproduction device of FIG. 2.
Figure 15:
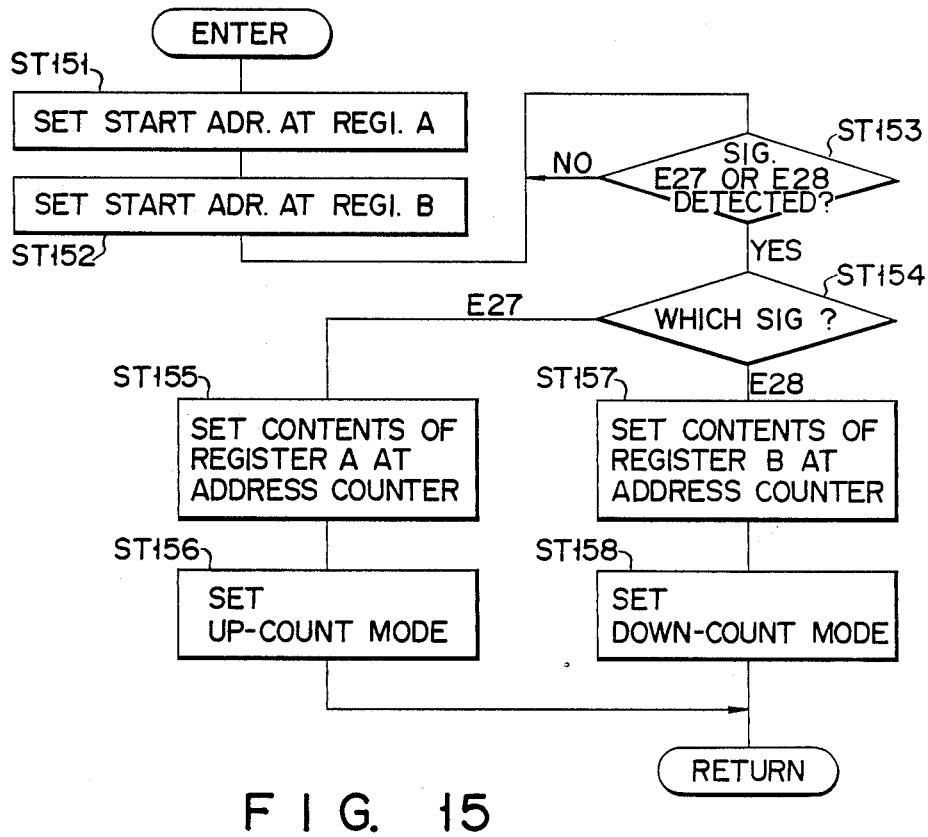
FIG. 15 is a flowchart for explaining the operation of the control circuit in FIG. 14.

FIG. 14 is an example of memory controller 18 in the recording/reproduction device of FIG. 2, and FIG. 15 is a flowchart for explaining the operation of controller 18 in FIG. 14.

Microprocesser (MPU) 181 sets data D182, indicating head address A of sector buffer memory 11, into register 182 (step ST151), and sets data D183, indicating end address B of memory 11, into register 183 (step ST152).

When record starting flag detection signal E27 or record end flag detection signal E28 is detected by means of detector 27 or 28 (yes in step ST153), MPU 181 determines which signal (E27 or E28) has been detected (step ST154).

If the detected signal is record starting flag detection signal E27, MPU 181 supplies head address set instruction E181A to register 182. Then, data D182 of head address A is set in address counter 184 (step ST155). When the data setting is completed, MPU 181 supplies up-count enable signal E181C (active low) to counter 184 (step ST156). This causes counter 184 to up-count clock CK. Thus, counter 184 supplies address data D18 being incremented for each clock to memory 11.

In this way, when record starting flag detection signal E27 is first detected, data 8 is written into memory 11 in the sequence from the left to right in FIG. 1A, for example.

In contrast, if the detected signal is record end flag detection signal E28, MPU 181 supplies end address set instruction E181B to register 183. The, data D183 of end address B is set in address counter 184 (step ST157). When the data setting is completed, MPU 181 supplies down-count enable signal E181D (active low) to counter 184 (step ST158). This causes counter 184 to down-count clock CK. This, counter 184 supplies address data D18 being decremented for each clock to memory 11.

In this way, when record end flag detection signal E28 is first detected, data 8 is written into memory 11 in the sequence from the right to left in FIG. 1A, for example.

Figure 16:
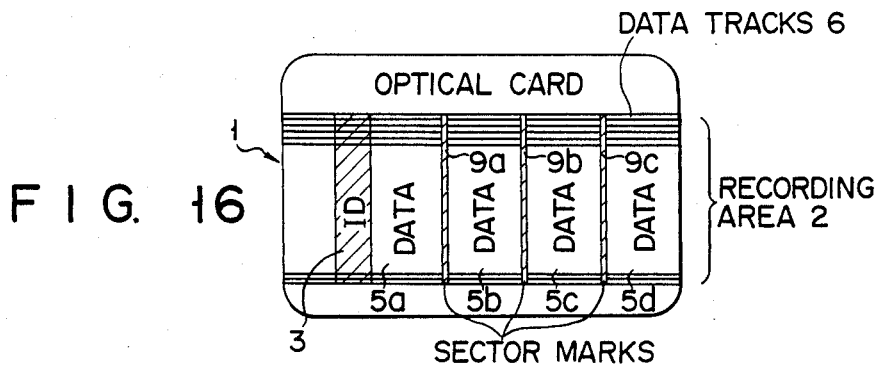
FIG. 16 illustrates the construction of an optical card (card-from recording medium) according to one embodiment of this invention.

FIG. 16 shows another embodiment of this invention. Optical card 1 has optical recording area 2 having a plurality of parallel tracks 6, ID sections 3 provided at one end portion of optical recording area 2 and having addresses for respective tracks 6, and four data sections 5a, 5b, 5c, and 5d which are provided at the right side of ID section 3 and divided by sector marks 9a, 9b, and 9c.

In order to suppress the influence due to damages and stains at the card end portion, and also in order to stabilize the speed of relative movement between optical card 1 and the optical head in the track extending direction, ID section 3 is located at a preset distance from the card end portion.

Sector marks 9a to 9c are formed in a predetermined format with unique particular patterns which are not used in data to be recorded in data sections 5a to 5d. For example, when data sections 5a to 5d are recorded by an MFM modulation technique, a pattern of repetitive pulse signals, having a period equal to three times the period of a basic clock, can be used as the particular pattern. This is because a pulse signal, having a period longer than two times the period of the basic clock, is not used in the modulation rule of MFM system.

Further, as in an optical disc, defects will occur in the optical card. More specifically, defects of 100 μm at maximum could occur. In order to reliably detect sector marks 9a to 9d even if such defects occur, the total length of the sector marks is preferably set to 300 μm or more. With this construction, if the particular pattern is continuously detected for 100 μm or more, it is determined as the sector mark.

Figure 17A:
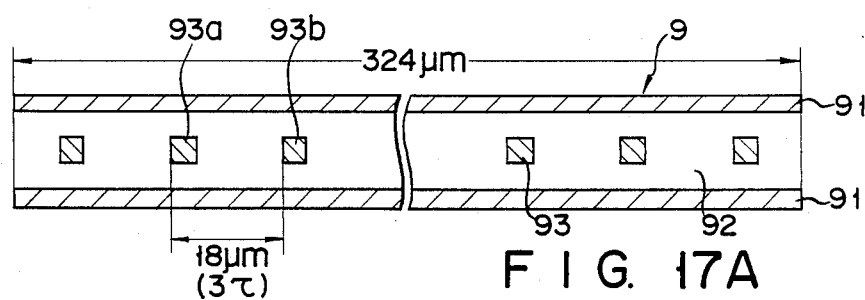
FIG. 17A is an enlarged view of a sector mark section in the optical card of FIG. 16.

FIG. 17A shows the construction of an example of the sector mark shown in FIG. 16. In this example, the sector mark is determined based on the assumption that the MFM system has a minimum pit interval ($\tau$) of 6 μm. In FIG. 17A, 91 denotes a tracking guide track; 92, a track; and 93, a pit constituting the sector mark formed in a predetermined format. The pit interval is set to 18 μm ($3\tau$) and thus set equal to three times the minimum pit interval ($\tau$). Further, the total length of the sector mark is set to 324 $\tau$m and thus set slightly larger than three times the maximum length (100 μm) of defects.

Figure 17B:
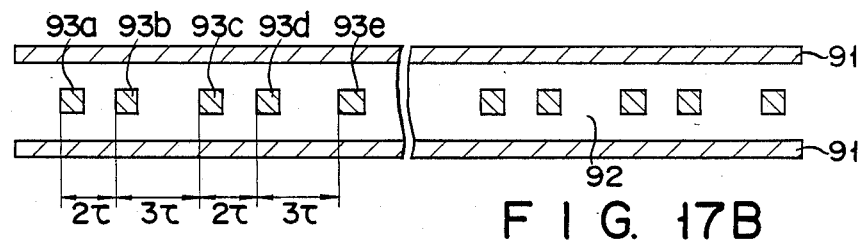
FIG. 17B is a modification of a sector mark of FIG. 17A.

FIG. 17B is a modification of the sector mark shown in FIG. 17A. In FIG. 17A, the pit interval of the sector mark is fixedly set to $3\tau$, but in FIG. 17B, the pit interval is alternately set to $2\tau$ and $3\tau$.

Figure 17C:
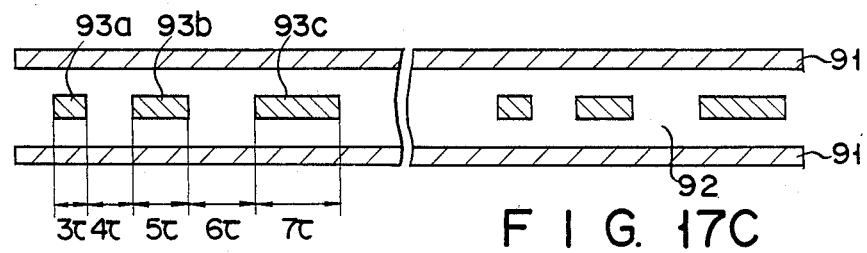
FIG. 17C is another modification of a sector mark of FIG. 17A.

FIG. 17C is another modification of the sector mark shown in FIG. 17A. In FIG. 17C, the pit of the sector mark is so set that 3-pit patterns appear repeatedly and pit widths and pit durations in each pit pattern are sequentially set to $3\tau$, $4\tau$, $5\tau$, $6\tau$, and $7\tau$ and thus sequentially increase by one $\tau$.

It should be noted that the pit pattern can be set in a desired form if it has a unique feature which is not provided in the pattern of data 8 shown in, for example, FIG. 1A.

Figure 18:
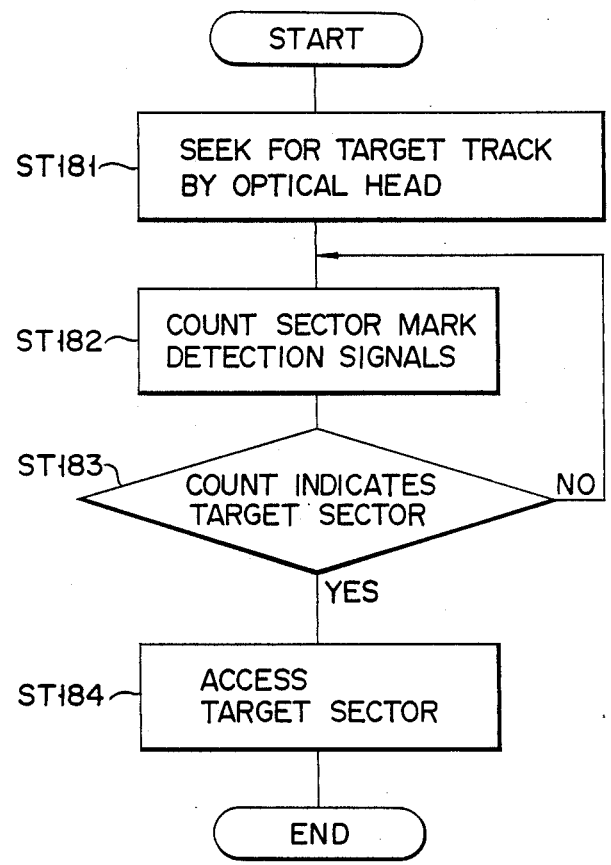
FIG. 18 is a flowchart explaining the manner of accessing a particular sector in a specified track of the optical card shown in FIG. 16.

FIG. 18 shows an example of flowchart explaining the operation of the recording/reproduction device for accessing a specified target sector of the particular track in optical card 1 described above.

First, the read/write optical head is driven to seek a specified track to be accessed according to data in read out ID section 3 (step ST181). Then, the optical head is moved relative to the optical card on the specified track in the track extending direction to detect a sector mark, and sector mark detection signals are counted (step ST182). When the counted value has reached a designated sector number (yes in step ST183), access to the designated sector is effected (step ST184). In this case, given sector numbers 0, 1, 2, and 3 respectively correspond to data sections 5a, 5b, 5c, and 5d shown in FIG. 16. A counter for counting the sector mark detection signals is reset when the seek operation of the optical head has finished.

FIG. 19 shows the construction of an example of a recording/reproduction device utilizing optical card 1 described above. In this example, optical card 1 is moved in the track direction and optical head 31 is moved in a direction perpendicular to the track direction so as to effect data recording/reproduction operation.

Optical card 1 is mounted on a proper portion of conveyer belt 33 which passes over pulleys 32a and 32b. Motor 35 is driven by means of motor driver 34 to reciprocally convey optical card 1 in the track extending direction. Encoder 36 is mounted on motor 35 to detect the position of optical card 1 with respect to optical head 31, and supplies output E36 to sector mark detector 37.

Optical head 31 is formed to project a write-in or readout light from laser diode 31a onto optical card 1, via optical system 31b, and apply the light reflected from optical card 1 to detector 31c. Output E311 of detector 31c is supplied to demodulator 38 which in turn produces readout signal E38. Another output E312 of detector 31c is supplied to focusing-tracking servo circuit 39. Servo circuit 19 detects a focus error signal and tracking error signal, and drives optical head 31 in a focusing and tracking direction according to the detected error signals, so that the incident light is to be focused on the target track of optical card 1.

Readout signal E38 is supplied to controller 40 which in turn detects a data reproduction signal and track address information from signal E38. Signal E38 is also supplied, together with output signal E36 of encoder 36, to sector mark detection circuit 37 which in turn detects the sector mark and supplies sector mark detection signal E37 to controller 40.

In the data reproduction mode, controller 40 supplies laser driving signal E402 to a laser driver 41, thereby causing laser diode 31a to generate low power readout light. Further, controller 40 provides signals E401, E403, and E404 in order to control the operation of motor driver 34, demodulator 38, and focus tracking servo circuit 39, to thereby seek and access a target sector of a target track, according to track information E38, demodulated by means of demodulator 38, and sector mark detection signal E37 from sector mark detector 37.

In the data write-in mode, after controller 40 seeks the target sector of the target track in the same manner as described above, it supplies laser driving signal E402 to laser driver 41 which causes laser diode 31a to generate high power write-in light modulated according to data to be recorded, thus recording data on the desired sector.

Circuit elements 40, 41, and 38 of FIG. 19 respectively correspond to circuit elements 18, 13, and 17 in FIG. 2. Further, circuit elements 31 to 35 and 39 correspond to circuit elements 14 to 16 in FIG. 2. In the case where the constructions of FIGS. 2 and 19 are attained in the same device, the corresponding circuit elements described above can be commonly formed by the same devices.

Figure 20:
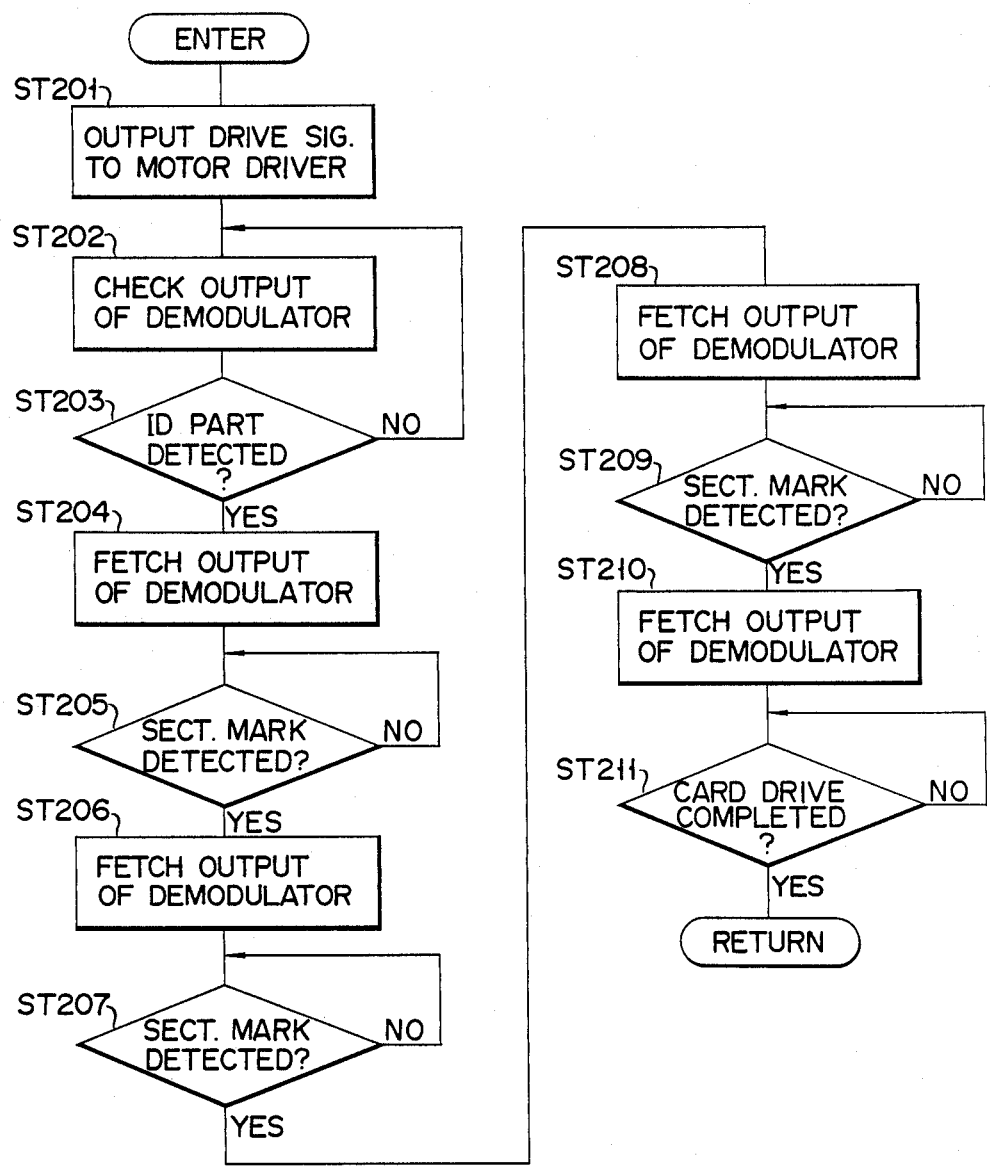
FIG. 20 is a flowchart for explaining the operation of control in the device of FIG. 19.

FIG. 20 is a flowchart for explaining the operation of controller 40 in FIG. 19 which is effected in the case where the contents of the optical card are read out from the left side of ID section 3.

Figure 7:
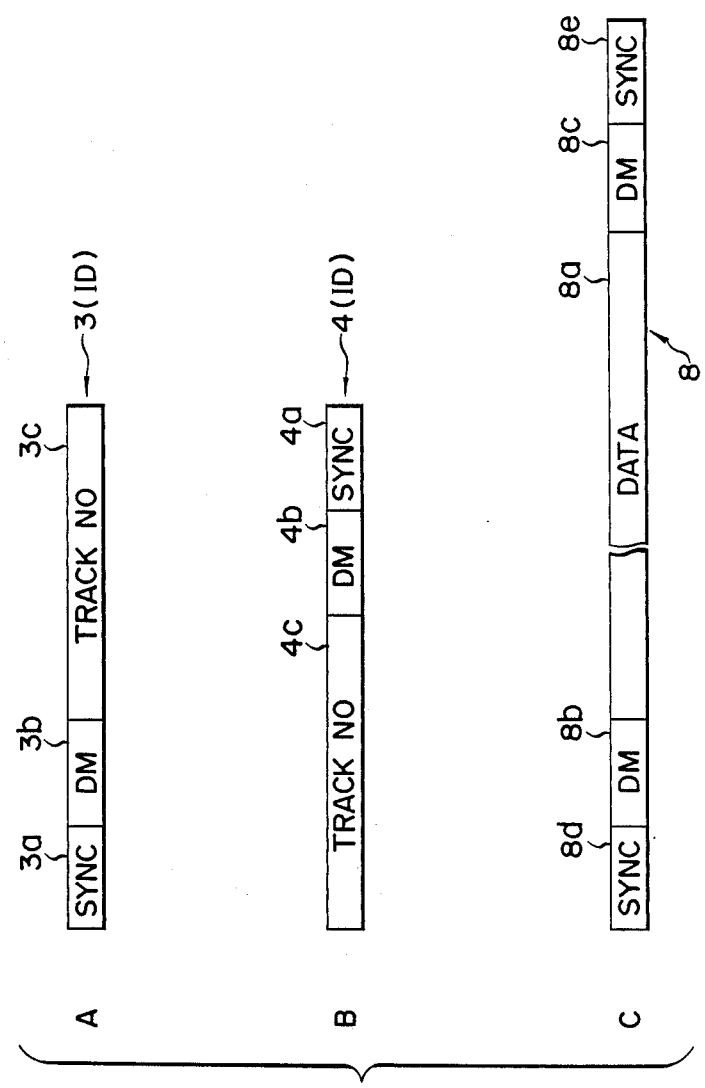
FIGS. 7A to 7C show examples of the data patterns of ID sections 3 and 4 in FIG. 6.

First, controller 40 supplies drive signal E401 to motor driver 34 so as to linearly move optical card 1 mounted on belt 33 (step ST201). Then, controller 40 checks the contents of demodulated output E38 obtained as a result of the movement (step ST202). If a pattern of ID section 3 as shown in FIG. 7A is detected in this checking operation (yes in step ST203), controller 40 fetches demodulated output E38 (step ST204). After this, controller 40 continuously checks demodulated output E38.

When first sector mark 9a is detected after the detection of the pattern in ID section 3 (yes in step ST205), controller 40 fetches demodulated output E38 (step ST206). Then, controller 40 continuously checks the demodulated output in the same manner, and when second and third sector mark 9b and 9c are detected (yes in steps ST207 and ST209), controller 40 fetches demodulated output E38 (steps ST208 and ST210).

After the linear movement of optical card 1 on belt 33 by means of motor 35 is completed, controller 40 can detect the completion of the card feed when an end code of demodulated output E38 is detected or the absence of demodulated output E38 is detected. When the completion of the card feed is detected, controller 40 performs another process routine (yes in step ST211).

FIG. 21 shows the circuit construction of an example of sector mark detection circuit 37 shown in FIG. 19. Sector mark detection circuit 37 includes pattern detector 42 for deriving a pattern of the sector mark, as is shown in FIG. 17A, from readout signal E38, counter 43 for counting output signal E36 from encoder 36, comparator 44 for comparing counted value E43 of counter 43 with a predetermined value, and OR gate 45 for supplying, as sector mark detection signal E37, the logical sum of outputs E42 and E44 of pattern detector 42 and comparator 44.

In general, signal E42, obtained by deriving a particular pattern (defined by pits shown in FIG. 17A) from readout signal E38 by means of pattern detector 42, is used as sector mark detection signal E37. However, since the optical card may have defects as described before, the sector mark cannot be always detected.

To avoid errors due to the above defects, output signal E36 of encoder 36 is counted by counter 43. When comparator 44 detects that counted value E43 has reached a value corresponding to either of the sector marks 9a to 9c on the optical card, comparator 44 supplies output signal E44 as auxiliary sector mark detection signal E36, thus obtaining sector mark detection signal E37 without fail, even when detects of the optical card occur just on the sector mark.

Since encoder 36 can be constructed to produce pulses (E36) at an interval corresponding to a pitch of 50 to 100 μm along the track extending direction on optical card 1, the positioning of the optical head with respect to the optical card can be attained at a sufficiently high precision in both the cases of reading data from the optical card and writing data into the optical card.

FIG. 22 shows an example of a pattern detector 37 in FIG. 21, and FIGS. 23A to 23H are timing charts for explaining the operation of the pattern detector 37.

In FIG. 22, readout signal E38 is used to clock D-type flip-flop 421 and to clear the contents of counter 422. After cleared by signal E38, counter 422 counts a counter clock as shown in FIG. 23A. Count D422 of counter 422 is compared with a predetermined value (14 to 18, for example) by comparator 423.

Figure 23:
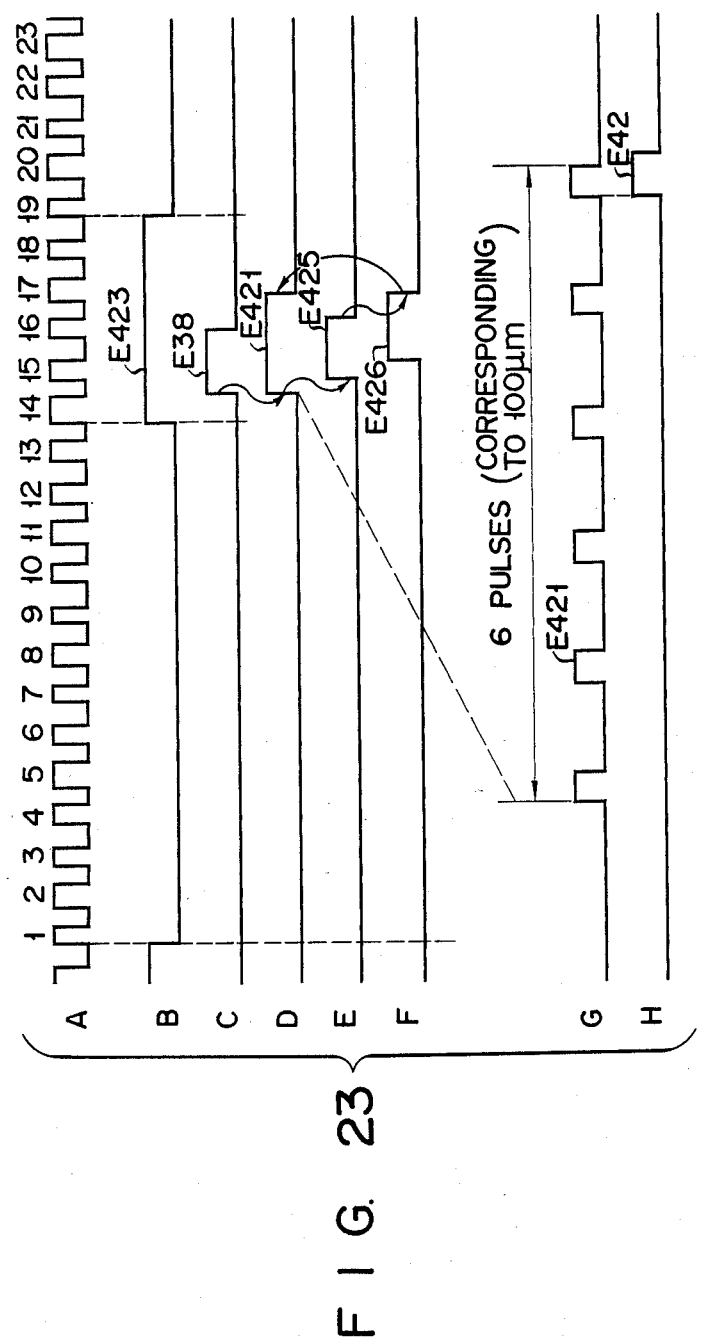
FIGS. 23A to 23H are timing charts for explaining the operation of the pattern detector shown in FIG. 22.

If count D422 corresponds to the predetermined value (14 to 18), comparator 423 supplies comparison output E423 shown in FIG. 23B to the inverted input terminal of OR gate 424. Then, OR-gate output signal E424, not shown in FIG. 23, becomes logic "0". This release the clear condition of D-type flip-flop 421 whose D input is set at logic "1", and signal E421 (FIG. 23D) is output from flip-flop 421 in response to subsequent signal E38 (FIG. 23C).

Signal E421 from flip-flop 421 is delayed by a delay circuit including one-shot multivibrators 425 and 426 (cf. E425 and E426 in FIGS. 23E and 23F). Delayed output E426 is supplied, via OR gate 424, to the clear input of flip-flop 421. This returns signal E421 to "0" level.

Signal E421 (FIG. 23G) thus obtained is counted by counter 427. Count D427 of counter 427 is compared with a predetermined value (for example, 6) by comparator 428. When D322 comes to correspond to the predetermined value (6; corresponding to length of 100 μm on card 1), comparator 428 supplies comparison output E428 to oneshot multivibrator 429. Then, one-shot multivibrator 429 provides sector mark detection signal E42 having a predetermined pulse width. (FIG. 23H)

Figure 24:
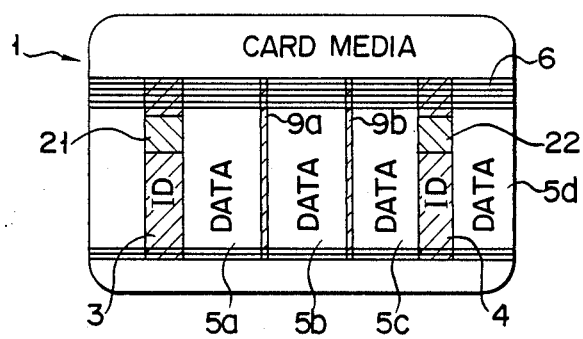
FIG. 24 shows the construction of an optical card obtained by applying the flag pattern shown in, for example, FIG. 1A to the optical card shown in, for example, FIG. 16.
Figure 25:
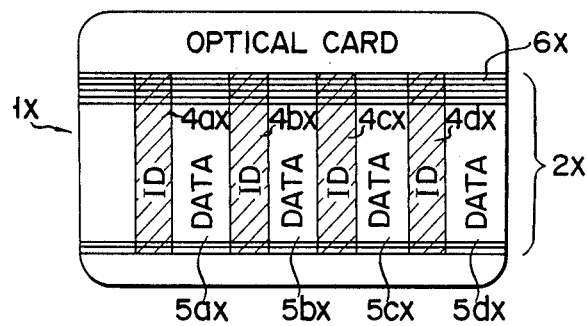
FIG. 25 shows the construction of an optical card having a plurality of ID sections.
Figure 26:
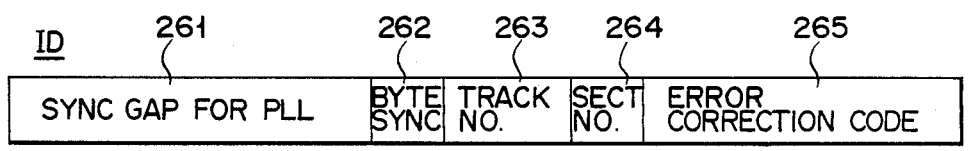
FIG. 26 shows an example of a data pattern of each ID section shown in FIG. 25.

This invention is not limited to the embodiments described above, and can be variously modified. For example, ID section 3 is provided only on one side of optical card 1 in the embodiment of FIG. 16, but it is possible to provide ID sections 3 and 4 on both sides of the optical card, as is shown in FIG. 24, to thereby allow the access of information in the optical card in either direction from the right to left or the left to right. In this case, it is sufficient to provide record starting flag 21 and record end flag 22 shown in FIG. 1A on both ID sections 3 and 4. The number of data sections (5a to 5d) provided in one track is not limited to four, but a desired number of divided data sections can be provided. Further, although position signal E36, indicating the position of optical card 1 with respect to optical head 31, is generated from encoder 36 mounted on motor 35 as shown in FIG. 19, it is also possible to derive position signal E36 by mounting a linear encoder on a member (33) supporting the optical card (1).

As described above, according to this invention, data is recorded together with information indicating the recording direction, so that the recorded data can be read out in either direction of the relative reciprocal movement between the card-form recording medium and the recording head. Thus, data can be efficiently recorded in a short time.

Further, according to this invention, since the sectors of the data recording section are divided by sector marks having a particular pattern which does not include information of the track, the length of the sector mark can be made short. Thus, data can be effectively recorded without materially reducing the serviceable area of the data recording section.

What is claimed is:

1. A card-form recording medium comprising:
   a plurality of recording tracks provided on said card-form recording medium; and
   means for indicating a data recording direction lengthwise along said plurality of recording tracks, including a direction indicating section provided on said card-form recording medium and formed at least at one of both ends of, respectively, each of said plurality of recording tracks.

2. A card-form recording medium according to claim 1, further comprising:
   an ID section, provided on said card-form recording medium, formed to include address information of a data section on each of said plurality of recording tracks, and formed at least at one of both ends of, respectively, each of said plurality of recording tracks; and
   a plurality of sector marks, provided nearer to the center of said card-form recording medium than said ID section, and formed to divide said data section into a plurality of sectors and to include a particular mark pattern which will not appear in said data section.

3. A card-form recording medium according to claim 1, wherein said means for indicating a data recording direction is provided outside said data section on said plurality of recording tracks.

4. A card-form recording medium according to claim 1, wherein said means for indicating a data recording direction is provided inside said data section on said plurality of recording tracks.

5. A card-form recording medium comprising:
a plurality of recording tracks provided on said card-form recording medium;
an ID section, provided on said card-form recording medium, including address information of a data section on each of said plurality of recording tracks, and formed at least at one of both ends of, respectively, each of said plurality of recording tracks; and
a plurality of sector marks, provided nearer to the center of said card-form recording medium than said ID section, and formed to divide said data section into a plurality of sectors and to include a particular mark pattern which will not appear in said data section.

6. A data recording device for a card-form recording medium comprising:
recording means for recording data on a plurality of recording tracks provided on said card-form recording medium, said data being recorded along a longitudinal direction of said tracks; and
formation means, coupled to said recording means, for forming a data recording direction indicating section at least at one of both ends of each of said plurality of recording tracks.

7. A data recording device according to claim 6, wherein said recording means forms an ID section, which includes address information of a data section provided on each of said plurality of recording tracks, at least at one of both ends of said recording tracks, and forms a plurality of sector marks nearer to the center of said card-form recording medium than said ID section, so that said data section is divided into a plurality of sectors, said ID section including a particular mark pattern which will not appear in said data section.

8. A data recording device according to claim 6, wherein said formation means places said data recording direction indicating section outside said data section on said recording tracks.

9. A data recording device according to claim 6, wherein said formation means places said data recording direction indicating section inside said data section on said recording tracks.

10. A data recording device according to claim 6, further comprising:
recording means for reproducing from said cardform recording medium a reproduction signal, including information of said data recording direction indicating section and data of said recording tracks;
data detection means, coupled to said reproduction means, for detecting recording track data of said recording tracks from the reproduction signal;
data recording direction detection means, coupled to said reproduction means, for detecting information of said data recording direction indicating section from the reproduction signal; and
memory means, coupled to said data detection means and data recording direction detection means, for storing the recording track data from a lower address when the information of said data recording direction indicating section represents a first direction, and storing the recording track data from an upper address when the information of said data recording direction indicating section represents a second direction opposite to the first direction, wherein the data stored in said memory means is used as data to be recorded on the recording tracks on said card-form recording medium.

11. A data recording device according to claim 7, further comprising:
readout means for reading out data from said plurality of recording tracks of said card-form recording medium;
moving means for moving said card-form recording medium relative to said readout means;
reproduction means, coupled to said readout means, for generating a reproduction signal including the data readout from a selected one of the plurality of recording tracks; and
sector mark detection means, coupled to said reproduction means, for detecting the sector mark from the reproduction signal.

12. A data recording device according to claim 11, further comprising:
position signal generating means, coupled to said moving means, for generating a position signal indicating a relative position between said card-form recording medium and said readout means,
wherein said sector mark detection means includes a sector mark detection circuit connected to said reproduction means and said position signal generating means, for detecting the sector mark based on the logical sum of the reproduction signal and the position signal.

* * * * *